(12) United States Patent
Yoshida et al.

(10) Patent No.: US 9,163,840 B2
(45) Date of Patent: Oct. 20, 2015

(54) GAS TURBINE COMBUSTOR AND FUEL SUPPLY METHOD USED FOR THE SAME

(75) Inventors: Shohei Yoshida, Hitachiohta (JP); Takeo Saitou, Hitachinaka (JP); Hiroshi Inoue, Mito (JP); Kazuyuki Ito, Hitachinaka (JP); Toshifumi Sasao, Mito (JP); Akinori Hayashi, Hitachinaka (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 932 days.

(21) Appl. No.: 13/305,561

(22) Filed: Nov. 28, 2011

(65) Prior Publication Data

US 2012/0131924 A1    May 31, 2012

(30) Foreign Application Priority Data

Nov. 30, 2010   (JP) .................... 2010-265897

(51) Int. Cl.
*F02C 7/228* (2006.01)
*F02C 9/26* (2006.01)
*F23R 3/34* (2006.01)

(52) U.S. Cl.
CPC ............ *F23R 3/343* (2013.01); *F02C 7/228* (2013.01); *F02C 9/263* (2013.01); *F23R 3/34* (2013.01); *F23R 3/346* (2013.01); *F23D 2900/00008* (2013.01); *F23D 2900/00015* (2013.01)

(58) Field of Classification Search
CPC ...... F02C 7/228; F02C 9/263; F05D 2200/31; F23R 3/04; F23R 3/10; F23R 3/286; F23R 3/34; F23R 3/346
USPC ................. 60/737, 746–749, 39.826
See application file for complete search history.

(56) References Cited

U.S. PATENT DOCUMENTS

| 5,899,074 | A | * | 5/1999 | Komatsu et al. | 60/737 |
| 2007/0227147 | A1 | * | 10/2007 | Cayre et al. | 60/742 |
| 2008/0078160 | A1 | * | 4/2008 | Kraemer et al. | 60/204 |
| 2008/0236165 | A1 |  | 10/2008 | Baudoin et al. | |

FOREIGN PATENT DOCUMENTS

JP    11-101435 A    4/1999

OTHER PUBLICATIONS

"Method and Apparatus for Controlling Gas Turbine Combustor", U.S. Appl. No. 13/213,263, filed Aug. 19, 2011. (Sixty-nine (69) pages).
"Combustor Control Method and Combustor Controller", U.S. Appl. No. 13/168,681, filed Jul. 20, 2011. (Fifty-one (51) pages).
European Search Report dated Apr. 20, 2012 (five (5) pages).

* cited by examiner

*Primary Examiner* — Andrew Nguyen
(74) *Attorney, Agent, or Firm* — Crowell & Moring LLP

(57) ABSTRACT

An object of the invention is to provide a reliable gas turbine combustor that can provide lowered NOx and combustion stability. The gas turbine combustor includes a combustion chamber to which fuel and air are supplied; a first burner located on the upstream side of the combustion chamber, the first burner jetting fuel into the combustion chamber and jetting air into the combustion chamber in a swirling manner; a plurality of second burners arranged around the first burner and supplying a premixed gas of air and fuel to the combustion chamber; an annular bulkhead disposed between the first burner and the second burners and having an inclined surface formed to broaden toward the downstream side of the combustion chamber; and a plurality of air jet ports formed in the inclined surface of the annular bulkhead and adapted to jet air into the combustion chamber.

6 Claims, 4 Drawing Sheets

GAS TURBINE COMBUSTOR AND FUEL SUPPLY METHOD USED FOR THE SAME

BACKGROUND OF THE INVENTION

1. Field of the Invention

The present invention relates to a gas turbine combustor and a fuel supply method therefor.

2. Description of the Related Art

Gas turbine combustors need, as a critical requirement, to provide stable combustion for a period of time ranging from starting-up to rated load operation even if operating conditions such as an air flow rate, a fuel flow rate and the like significantly change. Also a combustion method is strongly demanded in which a discharge amount of nitrogen oxide discharged from a gas turbine combustor is decreased. Nitrogen oxide will be referred as NOx hereinafter.

A premixed combustion method is one example of combustion methods allowing a less NOx discharge amount to be discharged. The premixed combustion method is such that fuel is mixed with air prior to combustion reaction and the mixture is then burnt. In general, a NOx amount is exponentially increased as combustion flame temperature is made high. However, if the premixed combustion method is used for gas turbine combustors, a local increase in combustion flame temperature can be prevented from occurring. Further if the ratio of air to fuel is increased so that premixed gas is made lean, the combustion flame temperature can be decreased. As a result, reduction in an amount of NOx discharge can be achieved.

To cope with an increasing strong demand for NOx reduction, opportunity of operating a combustor based on a lean premixed combustion, in which a premixed gas is made far leaner, has recently increased when the premixed combustion method is applied. However, the lean mixed combustion generally has following characteristics: flames are more likely to blow off than those in diffusion combustion in which air and fuel are burnt while they are mixed with each other, and combustion oscillation is liable to occur. Therefore, the premixed combustion method has a limited operational range where stable combustion is possible.

In view of the above, the lean premixed combustion method is combined with the diffusion combustion method having high combustion stability to promote reduction of NOx while the stabilization of combustion is ensured.

JP-11-101435-A describes a method of suppressing the sway of flames, which is formed by a diffusion combustion burner even when a flow rate of fuel to be supplied to the diffusion combustion burner is reduced for the purpose of reducing a NOx discharge amount.

SUMMARY OF THE INVENTION

JP-11-101435-A does not sufficiently disclose a control method considering the practical use of a gas turbine and a method of achieving a further stable combustion state. Therefore, the disclosure has limitations to cope with the increasing strong demand for lowering of NOx while ensuring stable combustion.

It is an object of the present invention, therefore, to provide a gas turbine combustor equipped with a diffusion combustion burner and a premixing combustion burner, wherein low NOx combustion and stable combustion can be consistent with each other.

According to an aspect of the present invention, there is provided a gas turbine combustor comprising:

a combustion chamber to which fuel and air are supplied;

a first burner located on an upstream side of the combustion chamber, the first burner jetting fuel into the combustion chamber and jetting air into the combustion chamber in a swirling manner;

a plurality of second burners arranged around the first burner, each of the second burners supplying a premixed gas of air and fuel to the combustion chamber;

an annular bulkhead disposed between the first burner and the second burners, the annular bulkhead having an inclined surface formed to broaden toward the downstream side of the combustion chamber; and a plurality of air jet ports formed in the inclined surface of the annular bulkhead, each of the air jet ports being adapted to jet air into the combustion chamber;

wherein if the number of the second burners arranged around the first burner is K, the number of the air jet ports provided is $K \times n + 1$ ($n = 1, 2, 3, \ldots$).

The present invention can provide a gas turbine combustor equipped with a diffusion combustion burner and a premixing combustion burner, wherein low NOx combustion and stable combustion can be consistent with each other.

DESCRIPTION OF THE PREFERRED EMBODIMENTS

In order to stabilize lean premixed combustion, there is provided a means for allowing stable diffusion flames to hold premixed flames by arranging annular premixing combustion burners so as to surround a diffusion combustion burner or by arranging a plurality of premixing combustion burners in the periphery of a diffusion combustion burner.

However, in the gas turbine combustor having the diffusion combustion burner and the premixing combustion burners arranged adjacently with each other, the flames formed by the burners will interfere with each other. For example, if the flames formed by the diffusion combustion burner sway, this makes the flames formed by the premixing combustion burners unstable. Therefore, this may increase the amplitude level of combustion oscillation in some cases.

However, according to a combustor described in the following embodiment, even if an air flow rate and a fuel flow rate are varied in a wide range in order to increase a lean premixed combustion rate to reduce a NOx discharge amount of a gas turbine combustor that is equipped with a diffusion combustion burner and a premix combustion burner, in an operation state from a partial load to a rated load, combustion oscillation does not occur, thus providing a gas turbine combustor that achieves stable combustor.

An embodiment of a gas turbine combustor embodying the present invention will hereinafter be described with reference to the drawings.

Figure 1:
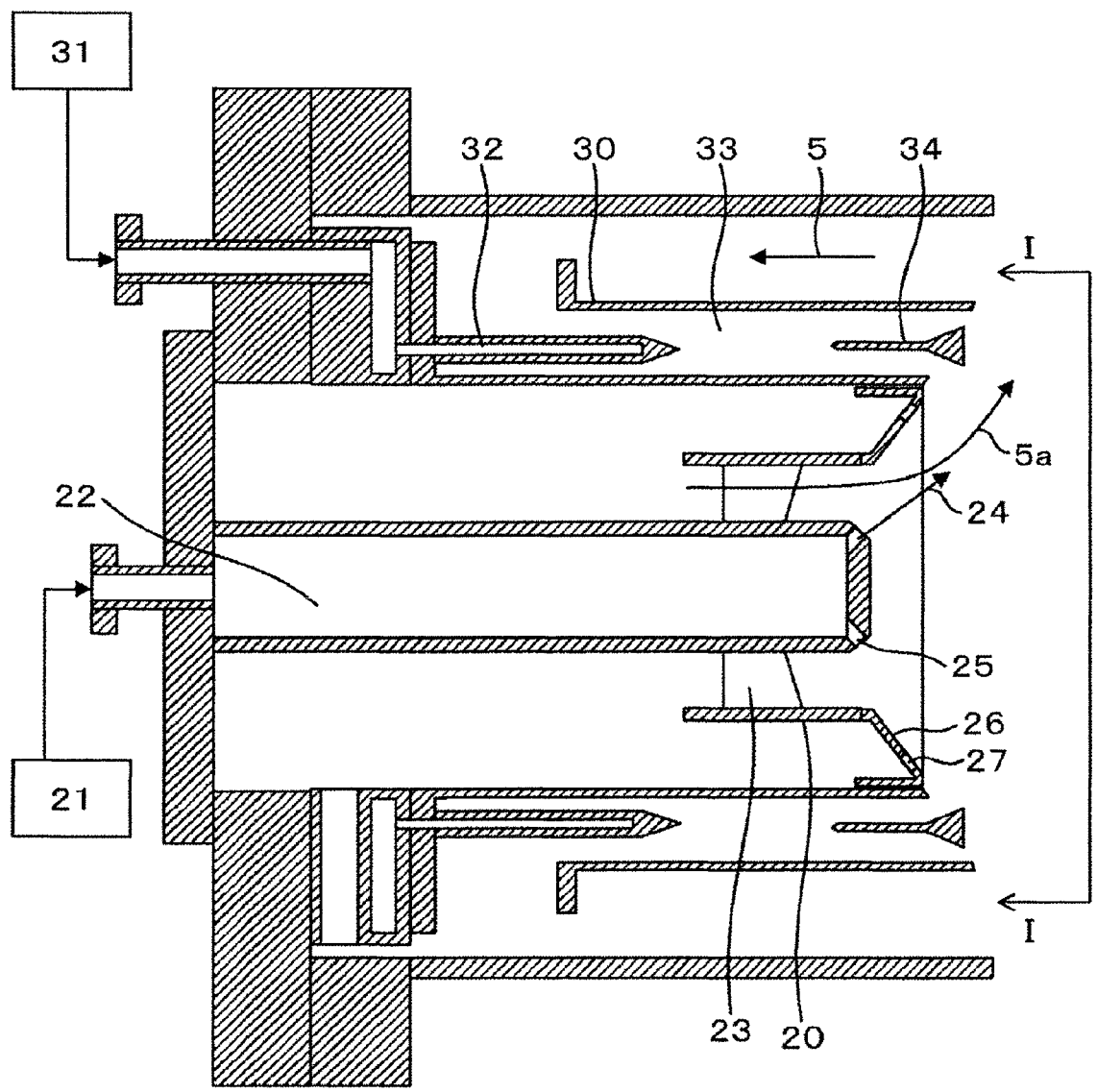
FIG. 1 is a longitudinal cross-sectional view of a combustor according to an embodiment.
Figure 2:
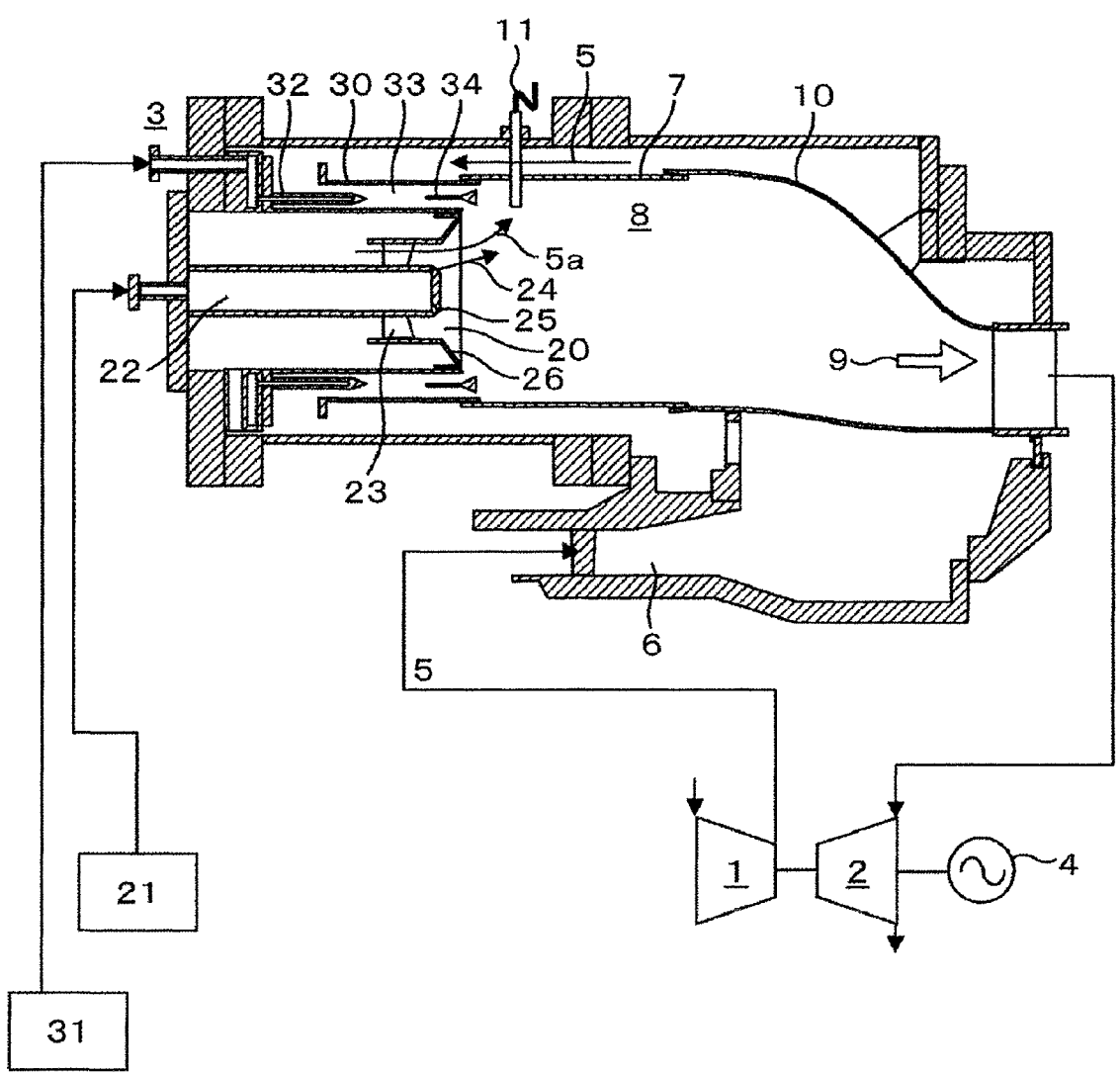
FIG. 2 illustrates the overall configuration of a gas turbine according to the embodiment.
Figure 3:
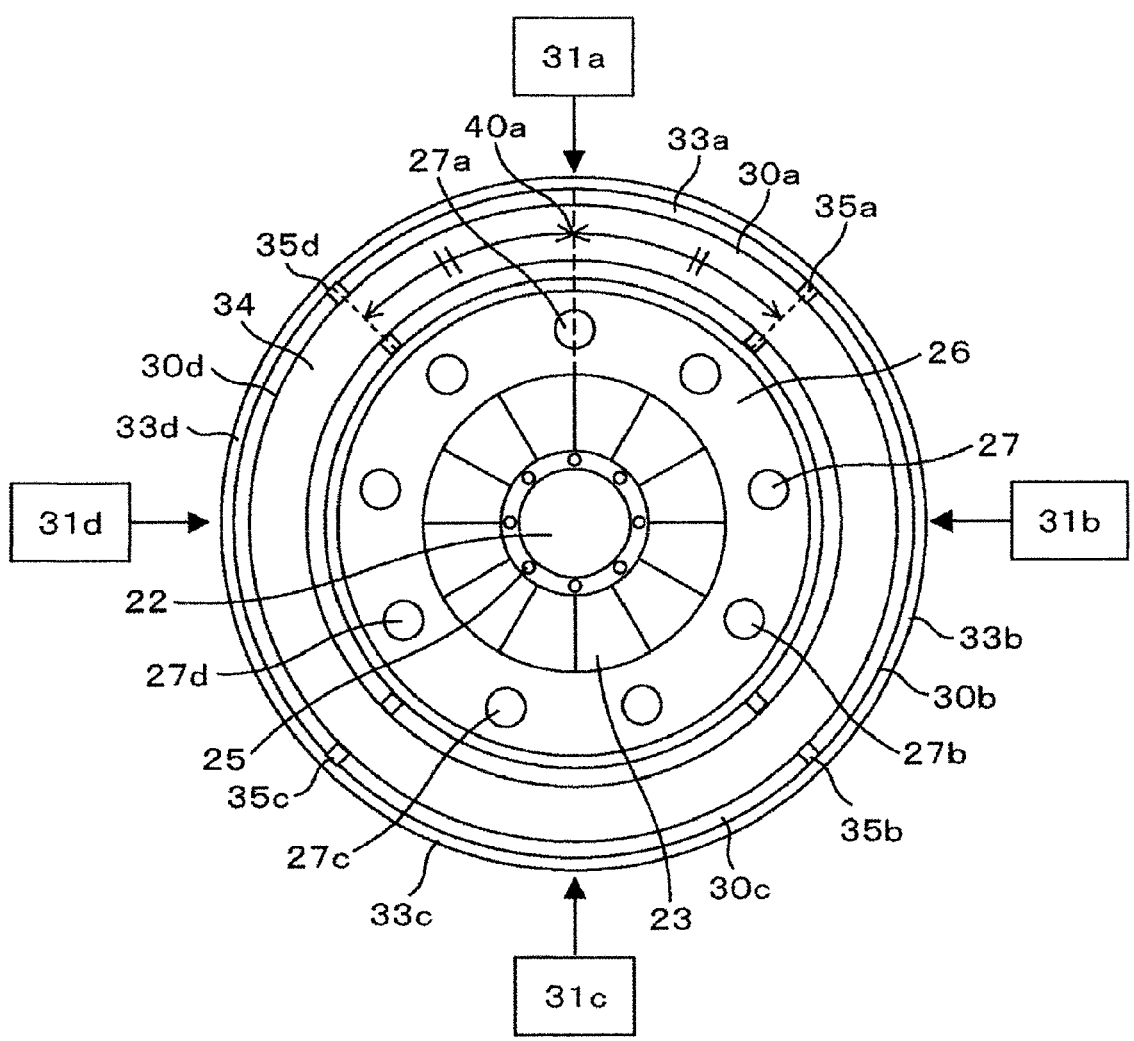
FIG. 3 is a view for assistance in explaining the combustor of the embodiment as viewed from the downstream side thereof, i.e., from arrows I-I in FIG. 1.

The embodiment of the present invention is described below with reference to FIGS. 1 to 4. FIG. 2 includes a longitudinal cross-sectional view illustrating a configuration of the gas turbine combustor according to the embodiment of the present invention and a schematic configuration view illustrating an overall configuration of a gas turbine plant equipped with the combustors. FIG. 1 is a cross-sectional view of the gas turbine combustor according to the present embodiment. FIG. 3 illustrates the gas turbine combustor as viewed from the downstream side thereof, i.e., from arrows I-I in FIG. 1.

The gas turbine plant shown in FIG. 2 mainly includes a turbine 2; a compressor 1 connected to the turbine 2 and obtaining compressed air for combustion; and a plurality of combustors 3. Compressed air 5 compressed by the compressor 1 is led to the combustor 3 via a compressed air passage 6 and is burnt with fuel in a combustion chamber 8 defined inside a combustor inner tube 7. Combustion gas 9 produced through combustion is jetted via a transition piece 10 to the turbine 2 for rotating a rotor. A power generator 4 coupled to the turbine 2 generates electric power.

A diffusion burner 20 is disposed at an axial central portion of the combustor 3 for diffusion combustion. A plurality of premixing burners 30 are arranged on the outer circumferential side of the diffusion burner 20 for premixed combustion. A bulkhead 26 with an inclined surface is disposed on the outer circumferential side of the diffusion burner 20 and on the inner circumferential side of the premixing burners 30.

The diffusion burner 20 is located on the upstream side of the combustion chamber 8. A fuel nozzle 22 adapted to jet fuel into the combustion chamber is installed at the axial center of the diffusion burner 20. A diffusion burner fuel supply system 21 is connected to the fuel nozzle 22. A swirling device 23 provided with swirling blades is disposed on the outer circumferential side of the fuel nozzle 22 in order to give a swirling component to combustion air 5a and jet the combustion air 5a into the combustion chamber 8. The combustion air 5a jetted is mixed, in the combustion chamber 8, with fuel 24 jetted from fuel jet ports 25 and the mixture is ignited for combustion by an ignition plug 11.

FIG. 3 is a view as viewed from arrows I-I in FIG. 1. In the present embodiment, the premixing burners 30 installed on the outer circumferential side of the diffusion burner 20 include four premixing burners 30a, 30b, 30c, and 30d. Each of the premixing burners includes a pre-mixer 33, a fuel nozzle 32 installed on the upstream side of the pre-mixer 33 and a flame stabilizer 34 disposed on the downstream side of the pre-mixer 33. A premixed fuel supply system 31 is connected to the fuel nozzle 32.

More specifically, the pre-mixer 33 is divided into four pre-mixers 33a, 33b, 33c, and 33d by premixing burner dividing plates 35a, 35b, 35c, and 35d. Corresponding to the four pre-mixers divided, also the premixed fuel supply system 31 adapted to supply fuel to the premixing burners is divided into four sub-systems 31a, 31b, 31c, and 31d. This makes it possible to individually supply fuel to each of the four pre-mixers. Thus, the premixing burners can individually form respective flames.

FIG. 1 is a cross-sectional view of the gas turbine combustor of the present embodiment. The annular bulkhead 26 is disposed between the diffusion burner 20 and the premixing burners 30. The annular bulkhead 26 is provided with the inclined surface formed to broaden toward the downstream side of the combustion chamber 8. The inclined surface of the bulkhead 26 is formed with a plurality of air jet ports 27 in a circumferential direction.

The gas turbine combustor of the present embodiment can reduce a NOx discharge amount because a ratio of a fuel flow rate of the premixing burner 30 is increased when the fuel flow rate of the diffusion burner 20 is reduced. In this case, with the combustor of the present embodiment, since flames are formed along the flow of air jetted from the air jet ports 27 arranged on the bulkhead 20, the variations of combustion flames of the diffusion burner 20 are suppressed.

A flow of air jetted from the air jet ports 27 exits at a boundary between the flow of air jetted from the diffusion burner 20 and the flow of air jetted from the premixing burner 30. Therefore, unstable flames are formed in a shear layer positioned at the boundary between the flow of air jetted from the diffusion burner 20 and the flow of air jetted from the premixing burner 30. This can prevent the occurrence of a phenomenon that serves to amplify the sway of the premixed flames. Further, this can make the combustion flames of both the burners independent and also make them stably exist.

On the other hand, eight of the fuel jet ports 25 of the fuel nozzle 22 for the diffusion burner 20 are formed and the swirling device 23 is composed of twelve of the swirl blades. In other words, the number of the fuel jet ports 25 is twice that of the premixing burners and the number of the swirling blades of the swirling device 23 three times that of the premixing burners.

In the gas turbine combustor of the present embodiment, in which the premixing burner that is a main constituent part is divided into a plurality of pieces, the swirling blades of the diffusion burner, the fuel jet ports of the fuel nozzle and the air jet ports, which are constituent parts having influences on combustion performance of the premixing burner, are each generally formed to be divided into integral multiple of the number of the pre-mixers to avoid the irregularity of the pre-mixers. For example, the combustor described in JP-11-101435-A has eight of the air jet ports while four of the premixing burners are formed.

As the combustor of the present embodiment, the number of the air jet ports 27 formed in the bulkhead 26 is nine. Specifically, the number (four) of premixing burners is doubled and further one is added thereto.

To reduce the NOx discharge amount, the gas turbine combustor in the present embodiment lowers the ratio of fuel to be burnt in the diffusion burner 20 and increases the ratio of fuel to be burnt in the premixing burners 30 particularly in the rated load condition. However, if the ratio of fuel to be burnt in the diffusion burner 20 is reduced, combustion oscillation is likely to occur.

The combustion oscillation of the gas turbine combustor is considered to occur abruptly due to the coincidence of the character frequency of air column resonance of the combustor and the fluctuation cycle of thermal energy. The character frequency of air column resonance of the combustor is determined from the configuration and operating conditions (combustion temperature, a flow rate and pressure) of the gas turbine combustor. The fluctuation cycle of thermal energy is produced by unstable combustion in the combustion burner, the flame stabilizer or the like. Further, in a case where the flames formed in the combustion chamber, particularly, the premixed flames formed by the premixing burner may be equalized in the circumferential and axial directions of the combustion chambere, also the fluctuation cycle of the thermal energy produced by the unstable combustion tends to be equalized. It is considered that the coincidence of this fluctuation cycle and the character frequency of air column resonance of the combustor may increase the combustion oscillation in some cases.

However, the combustor of the present embodiment, which is formed with nine of the air jet ports 27 with respect to four of the divided premixing burners 30a, 30b, 30c, and 30d can change the circumferential cycle nature of the premixed flames. This can suppress the state where the character frequency of air column resonance of the combustor and the fluctuation cycle of thermal energy coincide with each other. Thus, the occurrence of the combustion oscillation can be suppressed.

Incidentally, the number of the air jet ports 27 is K×n+1 (n=1, 2, 3, . . . ) if the number of the premixing burners 30 is K. This can change the circumferential cycle nature of the premixed flames formed on the downstream of the premixing burners 30. This makes a damping effect work on the combustion oscillation, which can suppress an increase in combustion oscillation. As a result, the use of the premixing burners 30 can reduce the NOx discharge amount and stable combustion with the occurrence of combustion oscillation suppressed can be enabled. Thus, it is possible to provide the highly reliable gas turbine combustor.

As shown in FIG. 3, the combustor of the present embodiment is formed with nine of the air jet ports 27 with respect to four of the premixing burners 30a, 30b, 30c, 30d. Therefore, three of the air jet ports 27 are formed in the area defined by the dividing plates 35a and 35d between the premixing burner 30a and the diffusion burner 20. In addition, two of the air jet ports 27 are formed in each of the other premixing burners 30b, 30c, 30d.

In the present embodiment, further, the air jet port 27a formed between the premixing burner 30a and the diffusion burner 20 is disposed to have the same phase as that of a central position 40a of the premixing burner 30a in the circumferential direction of the combustor. Further, the nine air jet ports are formed at regular intervals in the circumferential direction of the bulkhead 26 with reference to the air jet port 27a. Therefore, even when the number of the air jet ports formed in the area of each of the premixing burners 30b, 30c, 30d is similarly two, positions at which the air jet ports are formed for each of the burners (for example, the distances from the corresponding dividing plates) can be made different from each other among the pre-mixers. The arrangement of the air jet ports as described above has an effect of further disturbing the circumferential cyclic nature of premixed flames and is effective for further suppression of combustion oscillation.

Figure 4:
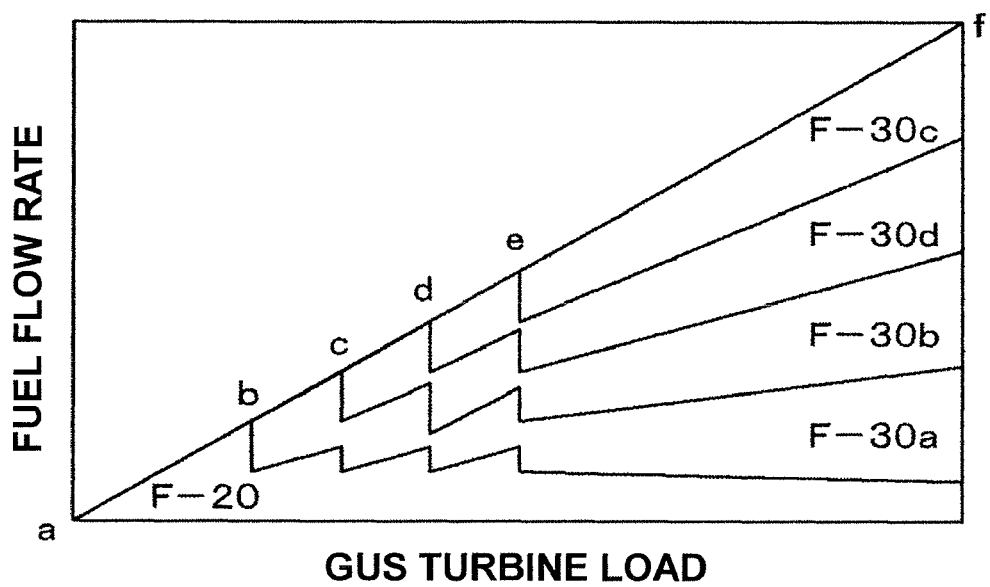
FIG. 4 is a graph for assistance in explaining a gas turbine load and a fuel supply method according to the embodiment.

A description is next given of a method of supplying fuel to the gas turbine combustor of the present embodiment. FIG. 4 is a graph in which the horizontal axis represents a gas turbine load and the vertical axis represents a flow rate of fuel supplied to each burner. The fuel flow rate of the diffusion burner 20 is denoted with symbol F-20. The fuel flow rate of the premixing burner 30a is denoted with symbol F-30a. Similarly, the fuel flow rate of the premixing burner 30b, symbol F-30b; that of the premixing burner 30c, symbol F-30c; and that of the premixing burner 30d, symbol F-30d. Point "a" denotes rated speed and no-load and point "f" denotes a rated load. The gas turbine burner is operated by the diffusion burner 20 alone from point "a" to point "b". When the gas turbine load reaches point "b", while the fuel flow rate F-20 of the diffusion burner 20 is lowered, fuel is supplied to the premixing burner 30a at the fuel flow rate F-30a to start premixed combustion. As the load is increased, the fuel flow rate F-20 and the fuel flow rate F-30a are increased. When the load reaches point "c", while the fuel flow rate F-20 and the fuel flow rate F-30a are lowered, the fuel is supplied to the premixing burner 30b at the fuel flow rate F-30b. Similarly, when the load is at point "d", fuel is supplied to the premixing burner 30d at the fuel flow rate F-30d. When the load is at point "e", fuel is supplied to the premixing burner 30c at the fuel flow rate F-30c. When the load is at over point "e", combustion is started using all the burners. To reduce the NOx discharge amount, at the rated load, the flow rate F-20 of fuel supplied to the diffusion burner is lowered and fuel supplied to the premixing burners 30a, 30b, 30c, and 30d is increased.

When the load is at point "b", the single combustion of the diffusion burner 20 is switched to mixed-combustion with the premixing burner 30a. Therefore, the load at point "b" shall be called the switching load "b". Similarly, the load at point "c" is called the switching load "c", the load at point "d" is called the switching load "d" and the load at point "e" is called the switching load "e". In terms of the switching load "b", after the switching, a ratio of fuel supplied to the diffusion burner 20 to fuel supplied to the premixing burner 30a is approximately 1:1, that is, the flow rate of fuel supplied to the diffusion burner 20 is equal to that of fuel supplied to the premixing burner 30. However, at the switching load "c", a ratio of fuel supplied to the diffusion burner 20 to fuel supplied to the premixing burners 30a and 30b is approximately 1:2. At the switching load "d", a ratio of fuel supplied to the diffusion burner 20 to fuel supplied to the premixing burners 30a, 30b and 30c is approximately 1:3. At the switching load "e", a ratio of fuel supplied to the diffusion burner 20 to fuel supplied to the premixing burners 30a, 30b, 30c and 30d is approximately 1:4. As described above, as the gas turbine load is increased, the ratio of the flow rate of fuel supplied to the diffusion burner to the flow rate of fuel supplied to the pre-mixers is set to be lowered. This setting is determined depending on the combustion characteristics of the diffusion burner 20 and the premixing burners 30a, 30b, 30c and 30d at each load of the gas turbine.

A description is next given of the action of a flow of air jetted from the air jet ports 27 provided in the bulkhead 26 in a case where fuel is supplied to the pre-mixer and the flame stabilizer 34 makes combustion stable. In the present embodiment described above, flames are formed along the flow of air jetted from the air jet ports 27 arranged on the bulkhead 26. This achieves stable combustion and reduces the NOx discharge amount.

On the other hand, to stably form premixed flames in the combustion area disposed downstream of the pre-mixer 33a at the switching load "b", appropriate fuel concentration of the premixed gas and the receipt of the thermal energy from the diffusion flames formed by the diffusion burner 20 are needed. At this time, a flow of air jetted from the air jet ports 27 may exist between the diffusion flames produced by the diffusion burner 20 and the premixed gas jetted from the pre-mixer 33a. In such a case, the flow of air jetted from the air jet ports 27 may lower the temperature of the diffusion flames depending on the combustion conditions of the diffusion burner 20. If the temperature of the diffusion flames is lowered, the thermal energy cannot efficiently be delivered to the premixed gas jetted from the pre-mixer 33a and thus, switching characteristics may possibly lower.

In the light of the operating method of the gas turbine combustor of the present embodiment described above and the above-mentioned switching characteristics, a description is given of an effect encountered when the number of the air jet ports is nine, in a case where the number of the premixing burners is four.

As shown in FIG. 4, at the switching load "b", fuel is supplied to the premixing burner 30a to form premixed flames. At this time, a ratio of a flow rate of fuel supplied to the diffusion burner 20 and to a flow rate of fuel supplied to the premixing burner 30a is 1:1. The percentage of fuel supplied to the diffusion burner 20 is higher than that at the other switching points. This means that the thermal energy of the diffusion flames is large, which is considered to be advantageous to ignition of the premixed gas. Therefore, although the number of the air jet ports 27 formed in the area between the premixing burner 30a and the diffusion burner 20 is three, i.e., is more than that of each of the other pre-mixers by one, the premixing burner 30a can sufficiently ignite the premixed gas.

At the switching load "c", fuel is next supplied to the pre-mixer 33b to form the premixed flames. As shown in FIG. 3, the air jet port 27b is formed close to the dividing plate 35b. This, along with the air flow jetted from the pre-mixer 33c, lowers the temperature of the diffusion flames, which adversely acts on the switching characteristics. However, the ratio of a flow rate of fuel supplied to the pre-mixers to a flow rate of fuel supplied to the diffusion burner is approximately 2:1. The thermal energy of the diffusion flames remains large. Therefore, switching at the switching load "c" can be done stably.

Likewise, at the switching load "d", the ratio of a flow rate of fuel supplied to the diffusion burner to a flow rate of fuel supplied to the premixing burners is approximately 3:1. The percentage of the combustion of the diffusion flames is further reduced. At the switching load "d", however, also the temperature of combustion air flowing into the pre-mixers increases along with an increase in gas turbine load. Thus, the switching at the switching load "d" can be done stably.

At the switching load "e", the thermal energy of the diffusion flames is further reduced such that the fuel ratio is approximately 4:1. However, the two air jet ports 27 formed in the range of the premixing burner 30c are located at respective positions sufficiently apart from the dividing plates 35b and 35c that are each adjacent to the respective air jet ports 27. Therefore, even though the thermal energy of the diffusion flames is small, the thermal energy of the premixed flames formed by the pre-mixers 33b, 33d assists the ignition of the premixed gas from the pre-mixer 33c. Thus, ignition of the premixed gas can be done stably.

As described above, fuel is first supplied, among the premixing burners 30, to the premixing burner 30a with the most air jet ports formed between the diffusion burner and the premixing burner 30a. Therefore, the state where the thermal energy of the diffusion flames is large can be made useful. Thus, switching between further stable operating states can be achieved.

Additionally, as fuel is lastly supplied to the premixing burner 30c opposed to the premixing burner 30a, it is possible to make efficient use of the thermal energy of the premixed flames formed by the premixing burners 30b, 30d adjacent to the premixing burner 30c. Thus, the further stable operating states can be switched therebetween.

As described above, the gas turbine combustor according to the present embodiment is configured as below: the premixing burner is divided into four pieces; nine numbers of the air jet ports is provided; an air jet port is formed at the position having the same phase in the circumferential direction of the combustor as that of the central position 40a of the premixing burner to which fuel is first supplied; and the remaining eight air jet ports are formed at regular intervals with reference to the air jet port. Fuel is sequentially supplied to the two pre-mixers adjacent to the pre-mixer to which the fuel is first supplied and lastly supplied to the pre-mixer located at the position opposed to the pre-mixer to which fuel is first supplied. In this way, the switching characteristics at each load can be improved. Thus, it is possible to lower the gas turbine load at the switching load "e" where all the burners are used for combustion. Further, the reliable gas turbine combustor can be provided that can reduce the NOx discharge amount through the premixed combustion at the rated load and suppress the occurrence of combustion oscillation.

The present invention can be applied to not only the gas turbine combustor for power generation but also to cogeneration systems capable of supplying both heat and electricity, gas turbine combustors as machinery driving engines such as a pump, a compressor and the like, and other various combustors.

What is claimed is:

1. A gas turbine combustor comprising:
    a combustion chamber to which fuel and air are supplied;
    a first burner located on an upstream side of the combustion chamber, the first burner jetting fuel into the combustion chamber and jetting air into the combustion chamber in a swirling manner;
    a plurality of second burners arranged around the first burner, each of the second burners supplying a premixed gas of air and fuel to the combustion chamber;
    an annular bulkhead disposed between the first burner and the second burners, the annular bulkhead having an inclined surface formed to broaden toward the downstream side of the combustion chamber; and
    a plurality of air jet ports formed in the inclined surface of the annular bulkhead, each of the air jet ports being adapted to jet air into the combustion chamber, the air jet ports formed between the first burner and the plurality of second burners, wherein one of the second burners has more of the air jet ports than the remaining second burners;
    wherein if the number of the second burners arranged around the first burner is K, the number of the air jet ports provided is K×n+1 (n=1, 2, 3, . . . ).

2. The gas turbine combustor according to claim 1,
    wherein the plurality of air jet ports are arranged at regular intervals in the circumferential direction of the annular bulkhead, and
    one of the plurality of air jet ports is disposed to correlate in the circumferential direction of the combustor with a central position of a second burner among the plurality of second burners.

3. A fuel supply method for the combustor according to claim 1, the method comprising the step of:
    supplying fuel first, among the plurality of second burners, to the second burner with the most air jet ports formed between the first burner and the second burner among the plurality of second burners.

4. The fuel supply method according to claim 3, further comprising the step of:
    supplying fuel lastly, among the plurality of second burners, to the other second burner disposed at a position opposed to the second burner to which fuel is first supplied among the plurality of second burners.

5. A gas turbine combustor comprising:
    a combustion chamber to which fuel and air are supplied;
    a first burner located on an upstream side of the combustion chamber, the first burner jetting fuel into the combustion chamber and jetting air into the combustion chamber in a swirling manner;
    a plurality of annular second burners arranged around the first burner, each of the annular second burners supplying a premixed gas of air and fuel to the combustion chamber;
    an annular bulkhead disposed on an outside of the first burner and on an inside of the second burners, the annular bulkhead having a surface formed to broaden, in radial cross-sectional area, toward the downstream of the combustion chamber, the surface being inclined with respect to a central axis of the combustion chamber; and a plurality of air jet ports disposed at circumferential intervals in the inclined surface of the annular bulkhead, each of the air jet ports being adapted to jet air in a central axial direction of the combustion chamber, the air jet ports formed between the first burner and the plurality of second burners, wherein one of the second burners has more of the air jet ports than the remaining second burners;

wherein the plurality of annular second burners are circumferentially divided into quarters by dividing plates, nine of the air jet ports are circumferentially provided in the inclined surface of the annular bulkhead, and the air jet ports are formed at circumferentially regular intervals in the circumferential direction of the combustor with reference to a central position of a second burner among the annular second burners divided.

6. A fuel supply method for the combustor according to claim 5, the method comprising the steps of:

supplying fuel first, among the plurality of second burners, to the second burner with the most air jet ports formed between the first burner and the second burner among the annular second burners; and supplying fuel lastly to the other second burner located at a position opposed to the second burner to which fuel is first supplied.

* * * * *